(12) United States Patent
Yokomizo et al.

(10) Patent No.: US 11,929,208 B2
(45) Date of Patent: Mar. 12, 2024

(54) MULTILAYER CERAMIC CAPACITOR

(71) Applicant: Murata Manufacturing Co., Ltd., Nagaokakyo (JP)

(72) Inventors: Satoshi Yokomizo, Nagaokakyo (JP); Toshihiro Harada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 18/121,629

(22) Filed: Mar. 15, 2023

(65) Prior Publication Data

US 2023/0238180 A1 Jul. 27, 2023

Related U.S. Application Data

(63) Continuation of application No. 16/822,065, filed on Mar. 18, 2020, now Pat. No. 11,631,537.

(30) Foreign Application Priority Data

Mar. 28, 2019 (JP) .................................. 2019-064074

(51) Int. Cl.
*H01G 4/12* (2006.01)
*H01G 4/008* (2006.01)
*H01G 4/012* (2006.01)
*H01G 4/232* (2006.01)
*H01G 4/30* (2006.01)

(52) U.S. Cl.
CPC ........... *H01G 4/1227* (2013.01); *H01G 4/012* (2013.01); *H01G 4/2325* (2013.01); *H01G 4/008* (2013.01); *H01G 4/30* (2013.01)

(58) Field of Classification Search
CPC ...... H01G 4/008; H01G 4/012; H01G 4/1227; H01G 4/2324; H01G 4/30
See application file for complete search history.

(56) References Cited

U.S. PATENT DOCUMENTS

| 2012/0229951 | A1* | 9/2012 | Kim ........................ H01G 4/30 29/25.42 |
| 2017/0018363 | A1* | 1/2017 | Tanaka ..................... H01G 4/30 |
| 2017/0301471 | A1* | 10/2017 | Ono ........................ H01G 4/224 |
| 2020/0058443 | A1* | 2/2020 | Kang .................... H01G 4/2325 |
| 2020/0152391 | A1* | 5/2020 | Kang ...................... H01G 4/12 |

OTHER PUBLICATIONS

Yokomizo et al., "Multilayer Ceramic Capacitor", U.S. Appl. No. 16/822,065, filed Mar. 18, 2020.

* cited by examiner

*Primary Examiner* — Nathan Milakovich
(74) *Attorney, Agent, or Firm* — Keating & Bennett, LLP

(57) ABSTRACT

A multilayer ceramic capacitor includes a laminate and an external electrode connected to the internal electrode layer. The laminate includes a central layer portion in which an internal electrode layer and a dielectric ceramic layer are alternately laminated, and a covering portion covering an outer surface of the central layer portion in the lamination direction and the width direction. A region where the main surface meets the lateral surface in the laminate is defined as a corner portion that is rounded, and a distance from the corner portion to an internal electrode closest to the corner portion is about 20 μm or less.

19 Claims, 7 Drawing Sheets

MULTILAYER CERAMIC CAPACITOR

CROSS REFERENCE TO RELATED APPLICATIONS

This application claims the benefit of priority to Japanese Patent Application No. 2019-064074 filed on Mar. 28, 2019. The entire contents of this application are hereby incorporated herein by reference.

BACKGROUND OF THE INVENTION

1. Field of the Invention

The present invention relates to a multilayer ceramic capacitor.

2. Description of the Related Art

For example, JP 2006-73623 describes, as a method of producing a multilayer ceramic capacitor, a method of alternately laminating green sheets and internal electrode layers before sintering to form a green chip, sintering the green chip, and then forming an external electrode on an end surface of a capacitor element body. JP 2006-73623 A describes that a paste for an external electrode is printed or transferred and sintered to form an external electrode, and that if necessary, a coating layer is formed on the surface of the external electrode by plating or the like.

In recent years, large-capacitance and small-sized multilayer ceramic capacitors have been demanded. In order to achieve such a multilayer ceramic capacitor, it is effective to reduce the thickness of an external electrode.

However, in the method described in JP 2006-73623 A, when the external electrode is thinned, a region where a base electrode layer of the external electrode is not formed is likely to occur at a corner portion where a main surface, a lateral surface, and an end surface of a capacitor element body meet. As a result, there is a risk that the plating property of the external electrode may be deteriorated.

SUMMARY OF THE INVENTION

Preferred embodiments of the present invention provide multilayer ceramic capacitors that each enable formation of an external electrode having high continuity of a base electrode layer and an excellent plating property.

A multilayer ceramic capacitor includes a laminate including a dielectric ceramic layer and an internal electrode layer that are laminated in a lamination direction, and an external electrode connected to the internal electrode layer, wherein the laminate includes a main surface that faces in the lamination direction and a lateral surface that faces in a width direction perpendicular or substantially perpendicular to the lamination direction, the laminate includes a central layer portion in which the internal electrode layer and the dielectric ceramic layer are alternately laminated, and a covering portion covering an outer surface of the central layer portion in the lamination direction and the width direction, and a region where the main surface meets the lateral surface in the laminate is defined as a corner portion, the corner portion is rounded, and a distance from the corner portion to an internal electrode closest to the corner portion is about 20 μm or less.

With each of the multilayer ceramic capacitors according to preferred embodiments of the present invention, an external electrode having high continuity of a base electrode layer and an excellent plating property is able to be provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
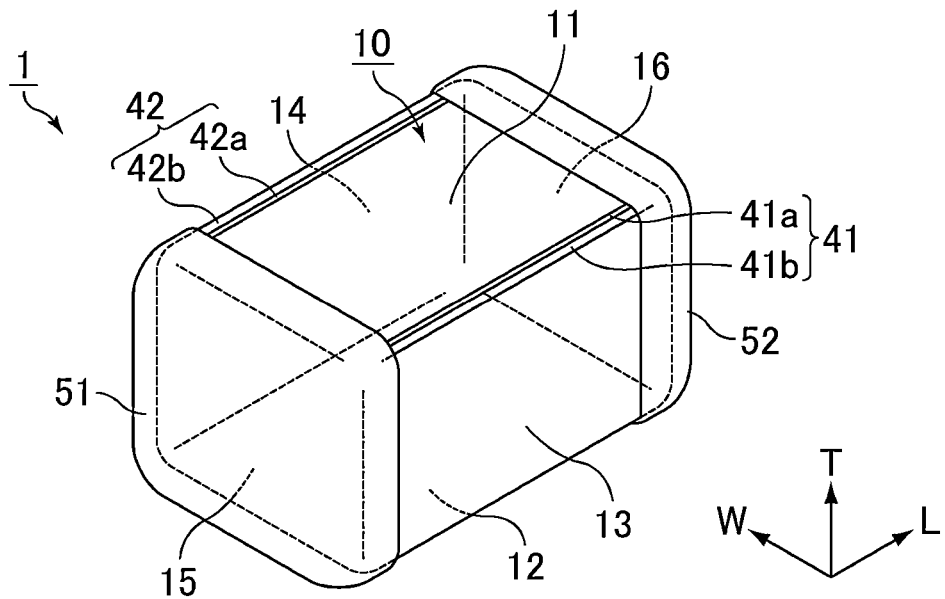
FIG. 1 is a perspective view schematically showing an example of a multilayer ceramic capacitor according to a preferred embodiment of the present invention.
Figure 2:
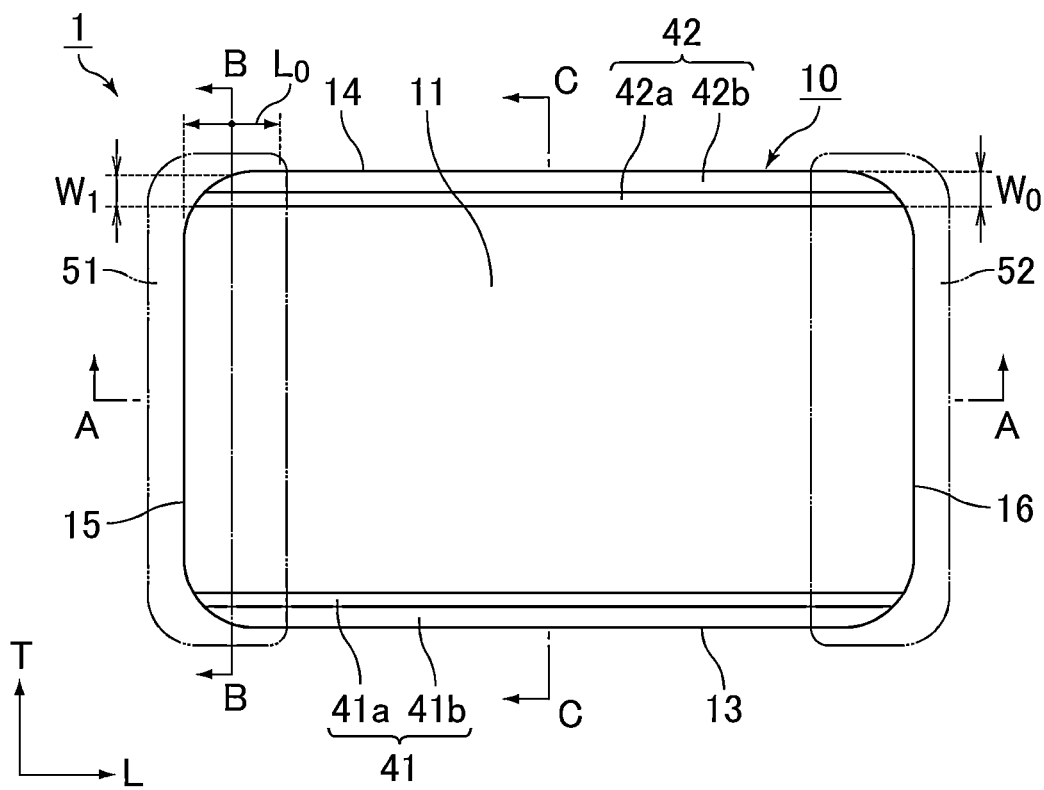
FIG. 2 is a plan view obtained when the multilayer ceramic capacitor shown in FIG. 1 is viewed from a first main surface side.

Preferred embodiments of the present invention will be described in detail with reference to the drawings.
Multilayer Ceramic Capacitor FIG. 1 is a perspective view schematically showing an example of a multilayer ceramic capacitor according to a preferred embodiment of the present invention. FIG. 2 is a plan view obtained when the multilayer ceramic capacitor shown in FIG. 1 is viewed from a first main surface side.

Herein, "lamination direction", "width direction", and "length direction" of the multilayer ceramic capacitor and the laminate are set as directions defined by arrows T, W, and L respectively as indicated in the multilayer ceramic capacitor 1 and the laminate 10 in FIG. 1. Here, the lamination (T) direction, the width (W) direction, and the length (L) direction are perpendicular or substantially perpendicular to one another.

As shown in FIG. 1 and FIG. 2, the multilayer ceramic capacitor 1 includes a laminate 10, and first and second external electrodes 51 and 52 respectively disposed on both end surfaces of the laminate 10.

As shown in FIG. 1, the laminate 10 has a rectangular parallelepiped shape or a substantially rectangular parallelepiped shape, and includes a first main surface 11 and a second main surface 12 that oppose each other in the lamination (T) direction, a first lateral surface 13 and a second lateral surface 14 that oppose each other in the width (W) direction perpendicular or substantially perpendicular to the lamination (T) direction, and a first end surface 15 and a second end surface 16 that oppose each other in the length (L) direction perpendicular or substantially perpendicular to the lamination (T) direction and the width (W) direction.

The laminate 10 is rounded at corners thereof. It is preferable that the laminate 10 is also rounded at edges thereof. The corner of the laminate 10 is a portion where three surfaces of the laminate 10 meet. The edge of the laminate 10 is a portion where two surfaces of the laminate 10 meet.

Figure 3:
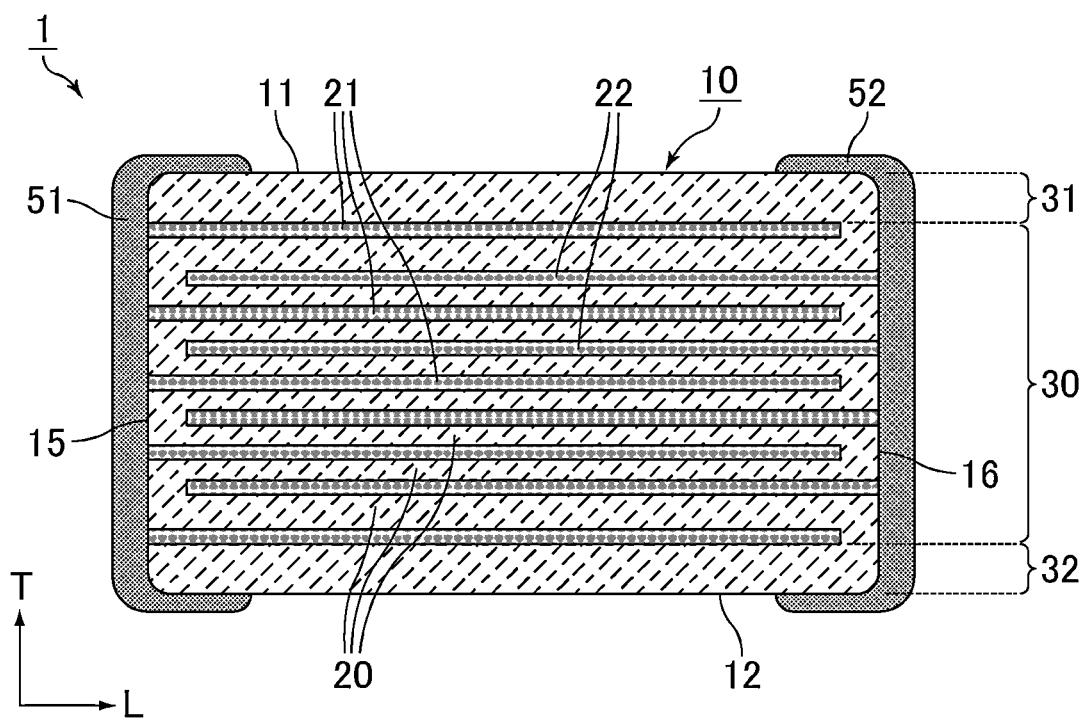
FIG. 3 is a cross-sectional view taken along a line A-A of the multilayer ceramic capacitor shown in FIG. 2
Figure 4:
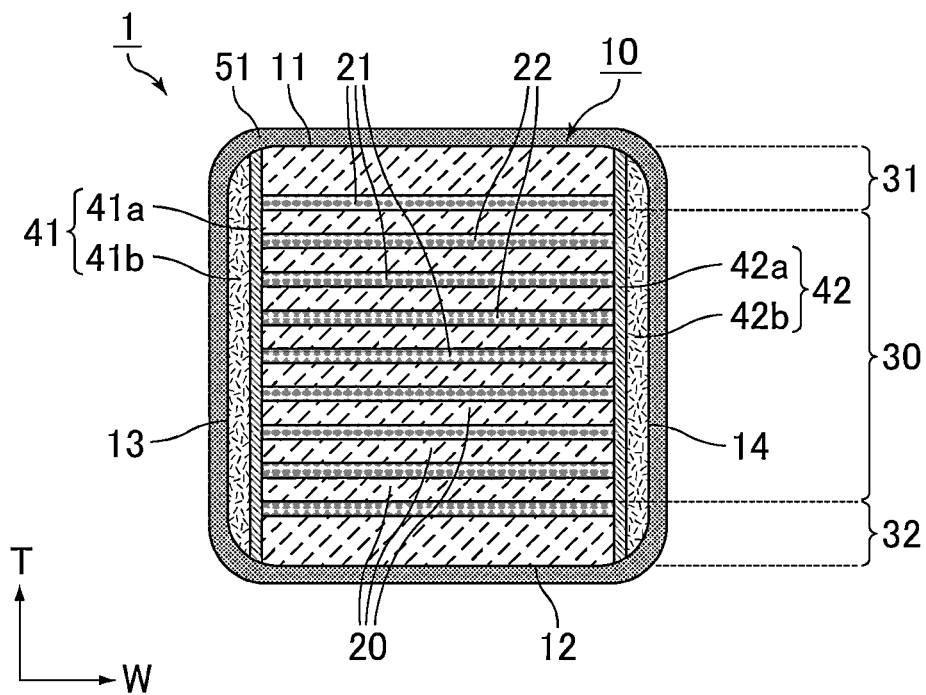
FIG. 4 is a cross-sectional view taken along a line B-B of the multilayer ceramic capacitor shown in FIG. 2.

FIG. 3 is a cross-sectional view taken along a line A-A of the multilayer ceramic capacitor shown in FIG. 2. FIG. 4 is a cross-sectional view taken along a line B-B of the multilayer ceramic capacitor shown in FIG. 2.

Herein, a cross-section of the multilayer ceramic capacitor 1 or the laminate 10 that is perpendicular or substantially perpendicular to the first end surface 15 and the second end surface 16 and parallel or substantially parallel to the lamination (T) direction is referred to as an LT cross-section which is a cross-section in the length (L) direction and the lamination (T) direction. Further, a cross-section of the multilayer ceramic capacitor 1 or the laminate 10 that is perpendicular or substantially perpendicular to the first lateral surface 13 and the second lateral surface 14 and parallel or substantially parallel to the lamination (T) direction is referred to as a WT cross-section which is a cross-section in the width (W) direction and the lamination (T) direction. Still further, a cross-section of the multilayer ceramic capacitor 1 or the laminate that is perpendicular or substantially perpendicular to the first lateral surface 13, the second lateral surface 14, the first end surface 15, and the second end surface 16 and also perpendicular or substantially perpendicular to the lamination (T) direction is referred to as an LW cross-section which is a cross-section in the length (L) direction and the width (W) direction. Accordingly, FIG. 3 shows the LT cross-section of the multilayer ceramic capacitor 1, and FIG. 4 shows the WT cross-section of the multilayer ceramic capacitor 1.

As shown in FIG. 3 and FIG. 4, the laminate 10 includes multiple dielectric ceramic layers 20, multiple first internal electrode layers 21, and multiple second internal electrode layers 22 that are laminated in the lamination (T) direction.

The dielectric ceramic layers 20 extend along the width (W) direction and the length (L) direction.

Each of the first internal electrode layers 21 and the second internal electrode layers 22 is disposed along the interface between the dielectric ceramic layers 20. Each of the first internal electrode layers 21 and the second internal electrode layers 22 extends in a tabular shape along the dielectric ceramic layers 20.

The first internal electrode layers 21 extend to the first end surface 15 of the laminate 10. The second internal electrode layers 22 extend to the second end surface 16 of the laminate 10 so as to oppose the first internal electrode layers 21 with the dielectric ceramic layers 20 therebetween. More specifically, the first internal electrode layer 21 and the second internal electrode layer 22 oppose each other with the dielectric ceramic layer 20 therebetween in the lamination (T) direction. Capacitance is generated from each portion where the first internal electrode layer 21 and the second internal electrode layer 22 oppose each other with the dielectric ceramic layer 20 therebetween.

Each of the first internal electrode layer 21 and the second internal electrode layer 22 preferably includes at least one metal selected from the group consisting of Ni, Cu, Ag, Pd, Au, and Ag—Pd alloy. Each of the first internal electrode layer 21 and the second internal electrode layer 22 may include the same dielectric ceramic material as the dielectric ceramic layer 20 in addition to the metal described above.

The first external electrode 51 is disposed on the first end surface 15 of the laminate 10. As shown in FIG. 3, the first external electrode 51 preferably extends from the first end surface 15 of the laminate 10 over a portion of each of the first main surface 11 and the second main surface 12, and as shown in FIG. 1, the first external electrode 51 more preferably extends from the first end surface 15 of the laminate 10 over a portion of each of the first main surface 11, the second main surface 12, the first lateral surface 13, and the second lateral surface 14. The first external electrode 51 is connected to the first internal electrode layers 21 on the first end surface 15.

The second external electrode 52 is disposed on the second end surface 16 of the laminate 10. As shown in FIG. 3, the second external electrode 52 preferably extends from the second end surface 16 of the laminate 10 over a portion of each of the first main surface 11 and the second main surface 12, and as shown in FIG. 1, the second external electrode 52 more preferably extends from the second end surface 16 of the laminate 10 over a portion of each of the first main surface 11, the second main surface 12, the first lateral surface 13, and the second lateral surface 14. The second external electrode 52 is connected to the second internal electrode layers 22 on the second end surface 16.

Each of the first external electrode 51 and the second external electrode 52 preferably includes a Ni layer including Ni and a ceramic material. The Ni layer is a base electrode layer. Such a Ni layer can be formed by a co-fire method by which the Ni layer is sintered simultaneously with the first internal electrode layers 21 and the second internal electrode layers 22. The Ni layer is preferably directly disposed on the laminate 10.

The types of elements included in the first external electrode 51 and the second external electrode 52 can be checked by performing elemental analysis using transmission electron microscope-energy dispersive X-ray spectroscopy (TEM-EDX).

The ceramic material is preferably present in the Ni layer in an amount of about 25 area % or more and about 40 area % or less, for example. In this case, the Ni layer can be easily formed by the co-fire method.

Further, the amount of the ceramic material in the Ni layer is preferably about 35 area % or less, for example.

The amount of the ceramic material in the Ni layer is measured by the following method using wavelength dispersive X-ray spectroscopy (WDX). First, a cross-section of a central portion in the width (W) direction of the multilayer ceramic capacitor 1 is exposed, and a central portion in thickness dimension of the Ni layer which is located at a central portion in the lamination (T) direction of the laminate 10 is magnified by 10,000 times. The field of view of the magnified region is set to about 6 μm× about 8 μm, for example. Thereafter, the magnified region is mapped by WDX, and an area ratio is measured from an image obtained by the mapping.

The first external electrode 51 preferably includes a Ni layer, a first plating layer, and a second plating layer in order from the first end surface 15 side of the laminate 10. Similarly, the second external electrode 52 preferably includes a Ni layer, a first plating layer, and a second plating layer in order from the second end surface 16 side of the laminate 10. The first plating layer is preferably formed by Ni plating, for example. The second plating layer is preferably formed by Sn plating, for example. Each of the first external electrode 51 and the second external electrode 52 may include a conductive resin layer including conductive particles and resin between the Ni layer and the first plating layer. For example, metal particles of at least one selected from the group consisting of Cu, Ag, and Ni may be used as the conductive particles in the conductive resin layer.

Note that the Ni layer may be formed by a post-fire method by which a conductive paste is applied and baked. In this case, the Ni layer may not include any ceramic material.

Alternatively, each of the first external electrode 51 and the second external electrode 52 may include a base electrode layer including metal such as Cu, for example. The base electrode layer may be formed by the co-fire method or may be formed by the post-fire method. Further, the base electrode layer may have a multilayer structure.

For example, the first external electrode 51 may have a four-layer structure that includes, for example, a Cu layer defining and functioning as a base electrode layer, a conductive resin layer including conductive particles and resin, a first plating layer, and a second plating layer in order from the first end surface 15 side of the laminate 10. Similarly, the second external electrode 52 may have a four-layer structure that includes, for example, a Cu layer defining as a base electrode layer, a conductive resin layer including conductive particles and resin, a first plating layer, and a second plating layer in order from the second end surface 16 side of the laminate 10.

As shown in FIG. 3 and FIG. 4, the laminate 10 includes a central layer portion 30, a peripheral layer portion 31, a peripheral layer portion 32, a side margin 41, and a side margin 42.

In the central layer portion 30, the first internal electrode layers 21 and the second internal electrode layers 22 are alternately laminated with the dielectric ceramic layers 20 therebetween. In FIG. 3 and FIG. 4, the central layer portion 30 includes a region sandwiched by a first internal electrode layer 21 closest to the first main surface 11 and a first internal electrode layer 21 closest to the second main surface 12 along the lamination (T) direction.

The dielectric ceramic layers 20 defining the central layer portion 30 preferably include, for example, a dielectric ceramic material including, as a main component, a perovskite compound including Ba and Ti. BaTiO$_3$ and the like are used as such a perovskite compound. The dielectric ceramic material included in the dielectric ceramic layers 20 defining the central layer portion 30 may include, for example, at least one additive selected from the group consisting of Si, Mg, Mn, Al, Zr, Ho, and Zn.

Herein, "the main component" means a component having the largest content in the ceramic material such as a dielectric ceramic material. "The additive" means a component whose content in the ceramic material such as, for example, a dielectric ceramic material is about 5 mol or less with respect to 100 mol of Ti as the main component. The content of the main component in the ceramic material and the content of the additive in the ceramic material can be checked by performing quantitative analysis using inductively coupled plasma (ICP) emission spectroscopy.

The peripheral layer portions 31 and 32 sandwich the central layer portion 30 therebetween in the lamination (T) direction. The peripheral layer portion 31 is disposed on a first main surface 11 side of the laminate 10. The peripheral layer portion 32 is disposed on a second main surface 12 side of the laminate 10.

Each of the peripheral layer portions 31 and 32 is made of a ceramic material.

The peripheral layer portions 31 and 32 are preferably made of, for example, a dielectric ceramic material including, as a main component, a perovskite compound including Ba and Ti (for example, BaTiO$_3$ or the like). The dielectric ceramic material included in the peripheral layer portions 31 and 32 may include, for example, at least one additive selected from the group consisting of Si, Mg, Mn, Al, Zr, Ho, and Zn.

It is preferable that each of the peripheral layer portions 31 and 32 includes multiple dielectric ceramic layers 20 laminated in the lamination (T) direction. Each of the peripheral layer portions 31 and 32 may have a single-layer structure including one dielectric ceramic layer 20, instead of the multilayer structure as described above.

When the peripheral layer portions 31 and 32 include the dielectric ceramic layers 20, the dielectric ceramic layers 20 defining the peripheral layer portions 31 and 32 may be made of the same dielectric ceramic material as the dielectric ceramic layer 20 defining the central layer portion 30, but may be made of a dielectric ceramic material different from the dielectric ceramic layer 20 defining the central layer portion 30.

The side margin 41 and the side margin 42 sandwich the central layer portion 30, the peripheral layer portion 31, and the peripheral layer portion 32 in the width (W) direction. The side margin 41 is disposed on the first lateral surface 13 side of the laminate 10. The side margin 42 is disposed on the second lateral surface 14 side of the laminate 10. In FIG. 4, the side margin 41 has a two-layer structure including an inner layer 41a on an innermost side in the width (W) direction and an outer layer 41b on an outermost side in the width (W) direction, and the side margin 42 has a two-layer structure including an inner layer 42a on an innermost side in the width (W) direction and an outer layer 42b on an outermost side in the width (W) direction.

Figure 5:
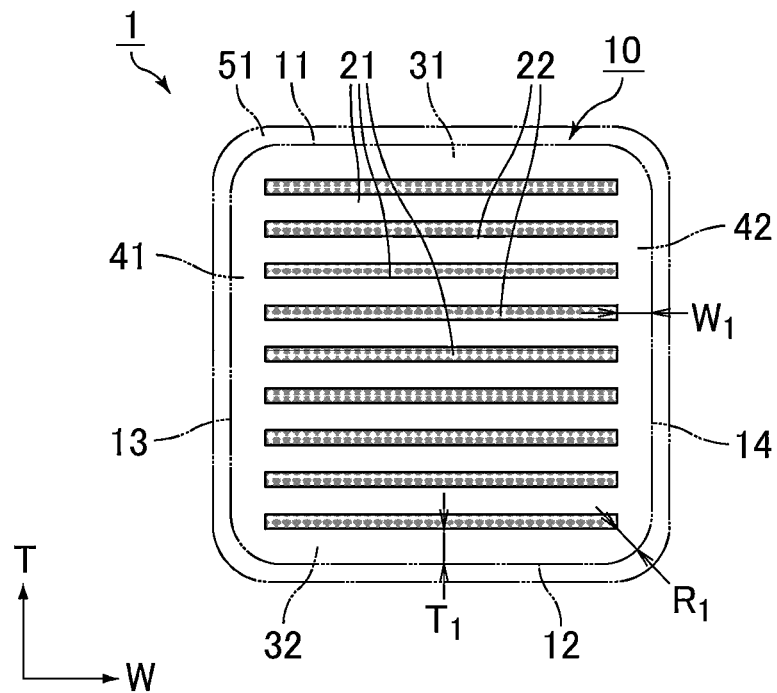
FIG. 5 is a schematic diagram showing dimensions and distances of respective portions on a WT cross-section of the multilayer ceramic capacitor shown in FIG. 4.

FIG. 5 is a schematic diagram showing dimensions and distances of respective portions on a WT cross-section of the multilayer ceramic capacitor shown in FIG. 4. FIG. 4 and FIG. 5 show WT cross-section of the laminate 10 and the first external electrode 51 at a central portion in the length (L) direction of the first external electrode 51 disposed on the first main surface 11 of the laminate 10. Specifically, the WT cross-section of the laminate 10 and the first external electrode 51 are exposed by polishing the multilayer ceramic capacitor 1 until the central portion in the length (L) direction of the first external electrode 51 disposed on the first main surface 11 of the laminate 10. This position corresponds to half the width indicated by a double-headed arrow Lo in FIG. 2, and it corresponds to the midpoint between the first end surface 15 of the laminate 10 and an end portion to which the first external electrode 51 is disposed on the first main surface 11. If necessary, an etching treatment is performed on a polished surface to remove the first internal electrode layers 21 and the second internal electrode layers 22 that have been stretched by polishing. Thereafter, the exposed WT cross-section is observed with a scanning electron microscope (SEM).

As shown in FIG. 5, when viewing the laminate 10 and the first external electrode 51 through a cross-section parallel or substantially parallel to the width (W) direction and the lamination (T) direction at the central portion in the length (L) direction of the first external electrode 51 disposed on the first main surface 11 of the laminate 10, a region where the first main surface 11 or the second main surface 12 meets the first lateral surface 13 or the second lateral surface 14 in the laminate 10 is defined as a corner portion. When the maximum value of the dimension in the width (W) direction of the side margin 41 or 42 is represented by $W_1$, the maximum value of the dimension in the lamination (T) direction of the peripheral layer portion 31 or 32 is represented by $T_1$, and a distance from an end portion in the width (W) direction of an internal electrode layer closest to the first main surface 11 or the second main surface 12 of the laminate (in FIG. 5, the first internal electrode layer 21) to the corner portion of the laminate 10 is represented by $R_1$, $W_1 > R_1$ is satisfied, and $T_1 > R_1$ is satisfied.

Figure 6:
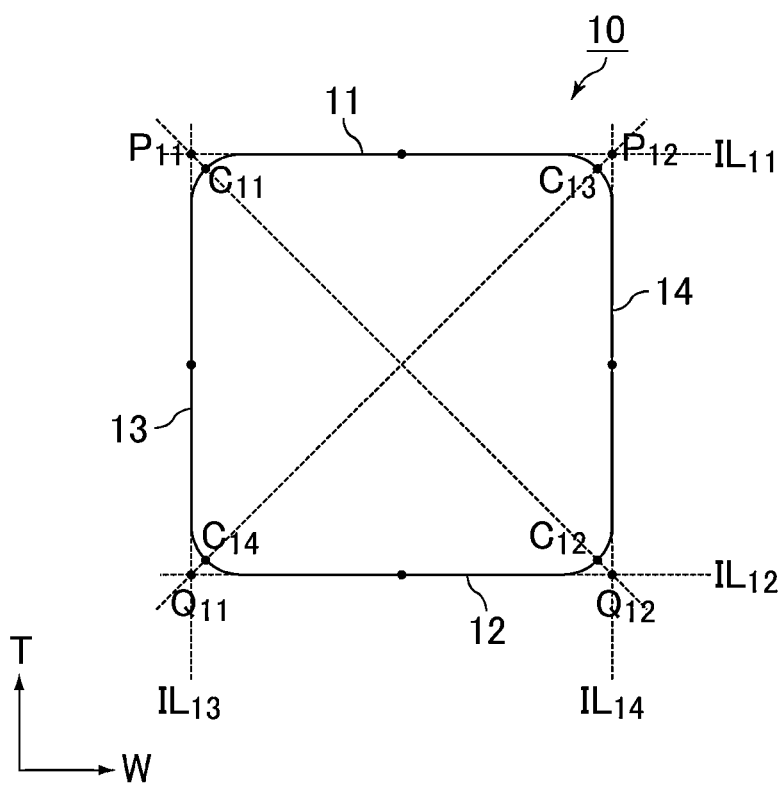
FIG. 6 is a schematic diagram showing the position of a corner portion when a distance $R_1$ is measured.

FIG. 6 is a schematic diagram showing the position of the corner portion when the distance $R_1$ is measured. As shown in FIG. 6, a virtual line $IL_{11}$ parallel or substantially parallel to the surface of the first main surface 11 and a virtual line $IL_{12}$ parallel or substantially parallel to the surface of the second main surface 12 are drawn at the central portion in the width (W) direction of the laminate 10, and a virtual line $IL_{13}$ parallel or substantially parallel to the surface of the first lateral surface 13 and a virtual line $IL_{14}$ parallel or substantially parallel to the surface of the second lateral surface 14 are drawn at the central portion in the lamination (T) direction of the laminate 10. A point at which the virtual line $IL_{11}$ and the virtual line $IL_{13}$ intersect is represented by $P_{11}$, a point at which the virtual line $IL_{11}$ and the virtual line $IL_{14}$ intersect is represented by $P_{12}$, a point at which the virtual line $IL_{12}$ and the virtual line $IL_{13}$ intersect is represented by $Q_{11}$, and a point at which the virtual line $IL_{12}$ and the virtual line $IL_{14}$ intersect is represented by $Q_{12}$. The surfaces of the laminate 10 that intersect with a straight line passing through the points $P_{11}$ and $Q_{12}$ or a straight line passing through the points $P_{12}$ and $Q_{11}$ are defined as corner portions $C_{11}$, $C_{12}$, $C_{13}$, and $C_{14}$. The distance from an end portion in the width (W) direction of the internal electrode layer closest to the first main surface 11 of the laminate 10 to the corner portion $C_{11}$ or $C_{13}$, and the distance from an end portion in the width (W) direction of the internal electrode layer closest to the second main surface 12 of the laminate 10 to the corner portion $C_{12}$ or $C_{14}$ are defined as $R_1$.

Satisfying $W_1 > R_1$ and satisfying $T_1 > R_1$ mean that the corner portions have a small thickness. Reduction of the thickness of the corner portion makes it possible to increase the roundness of the corner portion. As a result, even when the external electrode is thinner, the base electrode layer of the external electrode is easily formed at the corner portion of the laminate, so that the continuity of the base electrode layer is improved. Therefore, the plating property of the external electrode is improved.

Note that $W_1 > R_1$ and $T_1 > R_1$ are preferably satisfied at all the corner portions in FIG. 5. However, if at least one corner portion satisfies $W_1 > R_1$ and satisfies $T_1 > R_1$, a corner portion that does not satisfy $W_1 > R_1$ or $T_1 > R_1$ may exist.

In FIG. 4 and FIG. 5, the laminate 10 and the first external electrode 51 are viewed through the cross-section parallel or substantially parallel to the width (W) direction and the lamination (T) direction at the central portion in the length (L) direction of the first external electrode 51 disposed on the first main surface 11 of the laminate 10. However, the laminate 10 and the first external electrode 51 may be viewed through the cross-section parallel or substantially parallel to the width (W) direction and the lamination (T) direction at the central portion in the length (L) direction of the first external electrode 51 on the second main surface 12 of the laminate 10.

As shown in FIG. 2, when viewing the laminate 10 through the cross-section parallel or substantially parallel to the width (W) direction and the lamination (T) direction at the central portion in the length (L) direction of the laminate 10, the maximum value of the dimension in the width (W) direction of the side margin 41 or 42 is represented by $W_0$, $W_0 > W_1$ is preferably satisfied. In this case, the edges near the first end surface of the laminate become thinner, so that the edges become more rounded, and the plating property of the external electrode is further improved.

The maximum value $W_1$ of the dimension in the width (W) direction of the side margin 41 or 42 is preferably about 25 μm or less, and more preferably about 20 μm or less, for example. As described later, by performing polishing such as barrel polishing on the laminate 10, the corner portions can be thinned. When the maximum value $W_1$ of the dimension in the width (W) direction of the side margin 41 or 42 is about 25 μm or less, the thickness of the corner portion can be reduced by polishing.

The maximum value $W_1$ of the dimension in the width (W) direction of the side margin 41 or 42 is preferably about 5 μm or more, for example. The dimensions in the width (W) direction of the side margins 41 and 42 are preferably equal or substantially equal to each other.

The maximum value $T_1$ of the dimension in the lamination (T) direction of the peripheral layer portion 31 or 32 is preferably about 40 μm or less, for example. The dimensions in the lamination (T) direction of the peripheral layer portions 31 and 32 are preferably equal or substantially equal to each other.

The distance $R_1$ from the end portion in the width (W) direction of the internal electrode layer (the first internal electrode layer 21 or the second internal electrode layer 22) closest to the first main surface 11 or the second main surface 12 of the laminate 10 to the corner portion of the laminate 10 is preferably about 20 μm or less, and more preferably about 15 μm or less, for example. Furthermore, the distance $R_1$ to the corner portion of the laminate 10 may be 0 μm.

Figure 7:
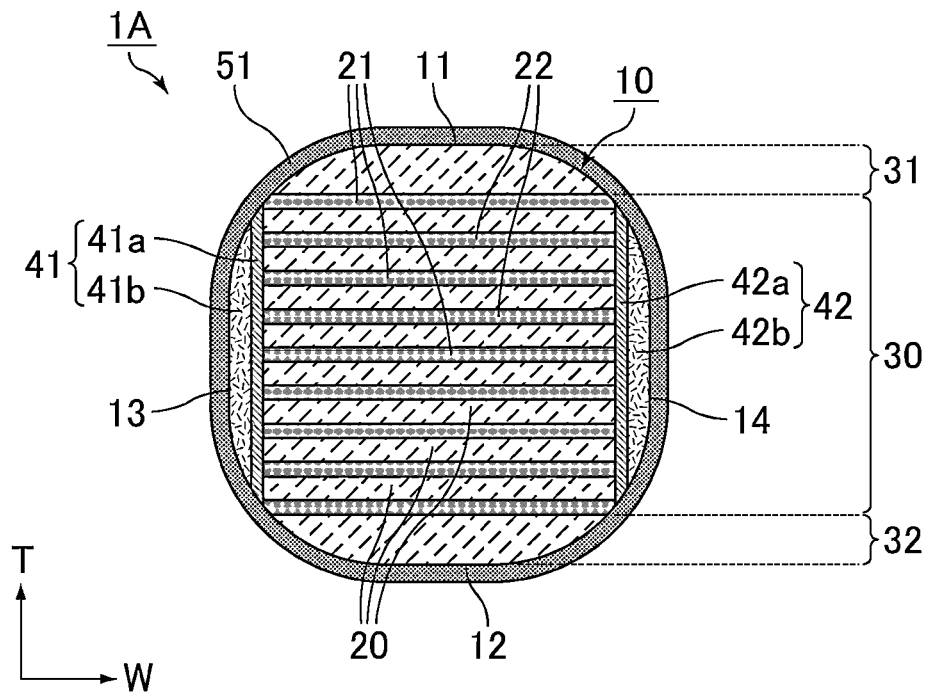
FIG. 7 is a WT cross-sectional view schematically showing another example of the multilayer ceramic capacitor according to a preferred embodiment of the present invention.

FIG. 7 is a WT cross-sectional view schematically showing another example of the multilayer ceramic capacitor according to a preferred embodiment of the present invention. FIG. 7 shows a WT cross-section of the laminate 10 and the first external electrode 51 at the central portion in the length (L) direction of the first external electrode 51 disposed on the first main surface 11 of the laminate 10 as in the case of FIG. 4 and FIG. 5.

In a multilayer ceramic capacitor 1A shown in FIG. 7, at the corner portions of the laminate 10, the first internal electrode layer 21 closest to the first main surface 11 or the second main surface 12 of the laminate 10 is connected to the first external electrode 51. In other words, the distance $R_1$ to the corner portions of the laminate 10 is 0 μm.

As shown in FIG. 7, at at least one corner portion of the laminate 10, the first internal electrode layer 21 closest to the first main surface 11 or the second main surface 12 of the laminate 10 may be connected to the first external electrode 51. In this case, since the first internal electrode layer 21 is connected to the first external electrode 51 in a region other than the first end surface 15 of the laminate 10, the electrical connectivity is improved.

In the multilayer ceramic capacitor 1A, it is allowed that the first internal electrode layer 21 closest to the first main surface 11 or the second main surface 12 of the laminate 10 is not connected to the first external electrode 51 at the corner portion $C_{11}$, $C_{12}$, $C_{13}$ and $C_{14}$ defined in FIG. 6. Specifically, it is more preferable that the position of the corner portion at which the first internal electrode layer 21 is connected to the first external electrode 51 is within, for example, about 5% of the dimension in the width (W) direction of the laminate 10 and within 5% of the dimension in the lamination (T) direction of the laminate 10 from the position of the corner portion $C_{11}$, $C_{12}$, $C_{13}$ and $C_{14}$. In the foregoing description, the laminate 10 and the first external electrode 51 are viewed through the cross-section parallel or substantially parallel to the width (W) direction and the lamination (T) direction at the central portion in the length (L) direction of the first external electrode 51 disposed on the first main surface 11 or the second main surface 12 of the laminate 10. Furthermore, it is preferable that the foregoing relationship is also satisfied in a case where the laminate 10 and the second external electrode 52 are viewed through the cross-section parallel to the width (W) direction and the lamination (T) direction at the central portion in the length (L) direction of the second external electrode 52 disposed on the first main surface 11 or the second main surface 12 of the laminate 10.

In other words, in the multilayer ceramic capacitor 1 or 1A, when viewing the laminate 10 and the second external electrode 52 through the cross-section parallel or substantially parallel to the width (W) direction and the lamination (T) direction at the central portion in the length (L) direction of the second external electrode 52 disposed on the first main surface 11 or the second main surface 12 of the laminate 10, a region where the first main surface 11 or the second main surface 12 meets the first lateral surface 13 or the second lateral surface 14 in the laminate 10 is defined as a corner portion, a maximum value of a dimension in the width (W) direction of the side margin 41 or 42 is represented by $W_2$, a maximum value of a dimension in the lamination (T) direction of the peripheral layer portion 31 or 32 is represented by $T_2$, and a distance from an end portion in the width (W) direction of an internal electrode layer (the first internal electrode layer 21 in FIG. 5) closest to the first main surface 11 or the second main surface 12 of the laminate 10 to the corner portion of the laminate 10 is represented by $R_2$, it is preferable that $W_2 > R_2$ and $T_2 > R_2$ are satisfied.

In this case, if at least one corner portion satisfies $W_2 > R_2$ and also satisfies $T_2 > R_2$, a corner portion that does not satisfy $W_2 > R_2$ or $T_2 > R_2$ may exist.

As shown in FIG. 2, when viewing the laminate 10 through the cross-section parallel or substantially parallel to the width (W) direction and the lamination (T) direction at the central portion in the length (L) direction of the laminate 10, the maximum value of the dimension in the width (W) direction of the side margin 41 or 42 is represented by $W_0$, $W_0 > W_2$ is preferably satisfied.

The maximum value $W_2$ of the dimension in the width (W) direction of the side margin 41 or 42 is preferably about 25 µm or less, and more preferably about 20 µm or less, for example. Further, the maximum value $W_2$ of the dimension in the width (W) direction of the side margin 41 or 42 is preferably about 5 µm or more, for example.

The maximum value $T_2$ of the dimension in the lamination (T) direction of the peripheral layer portion 31 or 32 is preferably 40 µm or less.

The distance $R_2$ from the end portion in the width (W) direction of the internal electrode layer (the first internal electrode layer 21 or the second internal electrode layer 22) closest to the first main surface 11 or the second main surface 12 of the laminate 10 to the corner portion of the laminate 10 is preferably about 20 µm or less, and more preferably about 15 µm or less. Further, the distance $R_2$ to the corner portion of the laminate 10 may be 0 µm.

At at least one corner portion of the laminate 10, the second internal electrode layer 22 closest to the first main surface 11 or the second main surface 12 of the laminate 10 may be connected to the second external electrode 52.

It is preferable that the side margin 41 includes multiple ceramic layers laminated in the width (W) direction. Specifically, the side margin 41 preferably includes an inner layer 41a on an innermost side in the width (W) direction and an outer layer 41b on an outermost side in the width (W) direction. The side margin 41 may have a structure of three or more layers instead of a two-layer structure. When the side margin 41 includes three or more ceramic layers, a ceramic layer on the innermost side in the width (W) direction is set as the inner layer 41a, and the other ceramic layers including a ceramic layer on the outermost side in the width (W) direction are set as the outer layer 41b.

Similarly, it is preferable that the side margin 42 includes multiple ceramic layers laminated in the width (W) direction. Specifically, the side margin 42 preferably includes an inner layer 42a on an innermost side in the width (W) direction and an outer layer 42b on an outermost side in the width (W) direction. The side margin 42 may have a structure including three or more layers, instead of a two-layer structure. When the side margin 42 includes three or more ceramic layers, a ceramic layer on the innermost side in the width (W) direction is set as the inner layer 42a, and the other ceramic layers including a ceramic layer on the outermost side in the width (W) direction are set as the outer layer 42b.

When the side margin includes the inner layer and the outer layer, for example, it is possible to improve the mechanical strength of the laminate by the outer layer while securing the adhesiveness to the peripheral layer portion and the central layer portion by the inner layer.

When the side margin has a two-layer structure including an inner layer and an outer layer, it can be checked that the side margin has the two-layer structure from the difference in sinterability between the inner layer and the outer layer by observation using an optical microscope in a dark field. The same applies to a case where the side margin has a structure of three or more layers.

The numbers of ceramic layers defining the side margins 41 and 42 may be equal to each other or different from each other. Further, each of the side margins 41 and 42 may have a structure including only one ceramic layer.

Each of the side margins 41 and 42 is made of a ceramic material.

The inner layers 41a and 42a are preferably made of, for example, a dielectric ceramic material including, as a main component, a perovskite compound including Ba and Ti (for example, $BaTiO_3$ or the like). The dielectric ceramic material included in the inner layers 41a and 42a may include, for example, at least one additive selected from the group consisting of Si, Mg, Mn, Al, Zr, Ho, and Zn.

The inner layers 41a and 42a are preferably made of the same dielectric ceramic material as the dielectric ceramic layer 20 defining the central layer portion 30, and the inner layers 41a and 42a are also more preferably made of the same dielectric ceramic material as the dielectric ceramic layer 20 defining the peripheral layer portions 31 and 32. However, the inner layers 41a and 42a may be made of a dielectric ceramic material different from that of the dielectric ceramic layer 20 defining the central layer portion 30, and may be made of a dielectric ceramic material different from that of the dielectric ceramic layer 20 defining the peripheral layer portions 31 and 32.

The outer layers 41b and 42b are preferably made of, for example, a dielectric ceramic material including, as a main component, a perovskite compound including Ba and Ti (for example, $BaTiO_3$ or the like). The dielectric ceramic material included in the outer layers 41b and 42b may include, for example, at least one additive selected from the group consisting of Si, Mg, Mn, Al, Zr, Ho, and Zn.

The outer layers 41b and 42b may be made of the same dielectric ceramic material as the inner layers 41a and 42a, or may be made of a dielectric ceramic material different from that of the inner layers 41a and 42a.

The outer layers 41b and 42b may be made of the same dielectric ceramic material as the dielectric ceramic layer 20 defining the central layer portion 30, or may be made of the same dielectric ceramic material as the dielectric ceramic layer 20 defining the peripheral layer portions 31 and 32. However, the outer layers 41b and 42b may be made of a dielectric ceramic material different from that of the dielectric ceramic layer 20 defining the central layer portion 30, and may be made of a dielectric ceramic material different from that of the dielectric ceramic layer 20 defining the peripheral layer portions 31 and 32.

Regarding the types of elements included in the ceramic material, they are checked by exposing a WT cross-section at the central portion in the length (L) direction of the multilayer ceramic capacitor 1 by polishing or the like and then performing element analysis using transmission electron microscope-energy dispersive X-ray spectroscopy (TEM-EDX).

Preferable thicknesses of the respective layers and the respective portions in the multilayer ceramic capacitor 1 will be described below.

The thickness (the thickness in the lamination (T) direction) of the dielectric ceramic layer 20 is preferably about 0.55 μm or less, for example. The thickness of the dielectric ceramic layer 20 is preferably about 0.4 μm or more, for example. Here, the thickness of the dielectric ceramic layer 20 specifically means the thickness of the dielectric ceramic layer 20 defining the central layer portion 30.

The thickness (the thickness in the lamination (T) direction) of each of the first internal electrode layer 21 and the second internal electrode layer 22 is preferably about 0.4 μm or less, and more preferably about 0.38 μm or less, for example. Furthermore, the thickness of each of the first internal electrode layer 21 and the second internal electrode layer 22 is preferably about 0.25 μm or more, for example.

The thicknesses of the dielectric ceramic layer 20, the first internal electrode layer 21, and the second internal electrode layer 22 are determined as follows.

Figure 8:
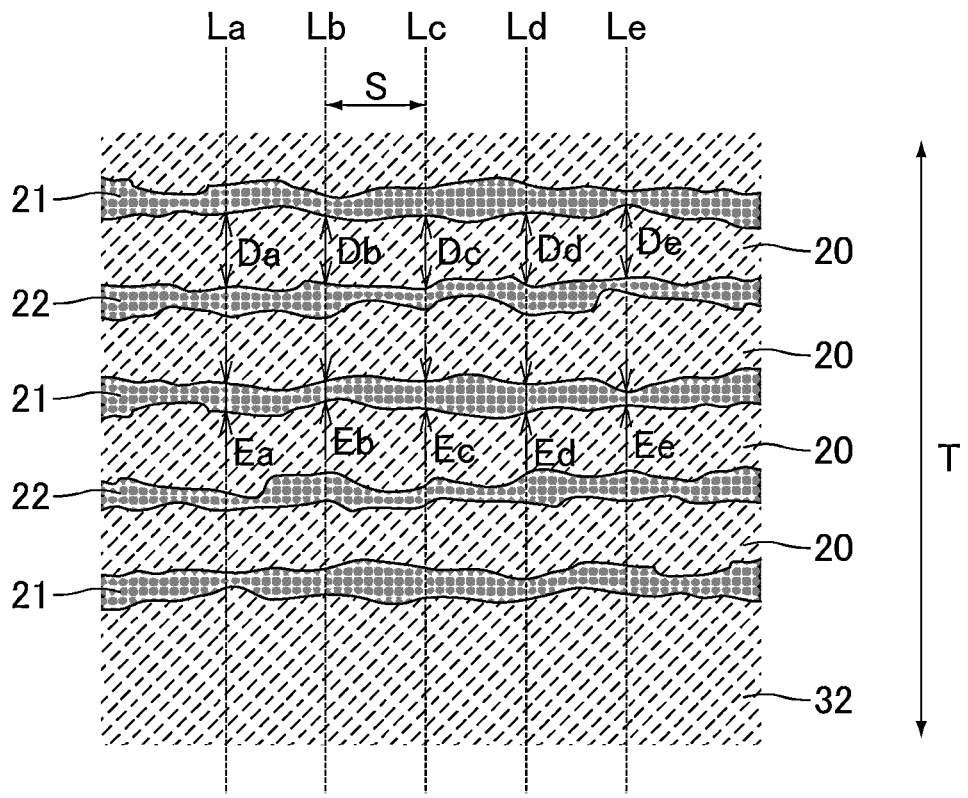
FIG. 8 is a schematic diagram showing a method of determining the thicknesses of a dielectric ceramic layer and an internal electrode layer.

FIG. 8 is a schematic diagram showing a method of determining the thicknesses of the dielectric ceramic layer and the internal electrode layer. FIG. 8 is a portion of the WT cross-section at the central portion in the length (L) direction of the multilayer ceramic capacitor 1, and it corresponds to a portion of a cross-section taken along a line C-C in FIG. 2.

First, the WT cross-section at the central portion in the length (L) direction of the multilayer ceramic capacitor 1 is exposed by polishing. If necessary, an etching treatment is performed on a polished surface to remove the first internal electrode layer 21 and the second internal electrode layer 22 that have been stretched by polishing. Then, the exposed WT cross-section is observed with a scanning electron microscope (SEM).

Next, a straight line Lc extending in the lamination (T) direction of the laminate 10 and passing through the center of the laminate 10 is drawn in an observed magnified image.

Then, multiple straight lines parallel or substantially parallel to the straight line Lc are drawn at equal or substantially equal intervals at a pitch S. The pitch S may be determined to be, for example, about 5 or more and about 10 or less times as large as the thickness of a dielectric ceramic layer 20 or a first internal electrode layer 21 or a second internal electrode layer 22 to be measured. For example, when a dielectric ceramic layer 20 having a thickness of about 1 μm is to be measured, the pitch S is set to about 5 μm. Here, when multiple straight lines parallel or substantially parallel to the straight line Lc are drawn, the same number of straight lines are drawn on each of both sides of the straight line Lc. In other words, an odd number of straight lines including the straight line Lc are drawn. FIG. 8 shows five straight lines La, Lb, Lc, Ld, and Le, for example.

The thicknesses of the dielectric ceramic layer 20, the first internal electrode layer 21, and the second internal electrode layer 22 on each straight line of the straight lines La, Lb, Lc, Ld, and Le are measured. However, when a first internal electrode layer 21 or a second internal electrode layer 22 is missing on each of the straight lines La, Lb, Lc, Ld, and Le and thus dielectric ceramic layers 20 sandwiching the missing internal electrode layer therebetween are connected to each other or when a magnified image at a measurement position is unclear, the thicknesses of the dielectric ceramic layer 20, the first internal electrode layer 21 and the second internal electrode layer 22 on another straight line which is drawn farther away from the straight line Lc are measured.

For example, when the thickness of the dielectric ceramic layer 20 is determined, as shown in FIG. 8, a thickness Da on the straight line La, a thickness Db on the straight line Lb, a thickness Dc on the straight line Lc, a thickness Dd on the straight line Ld and a thickness De on the straight line Le are measured, and the average value of these thicknesses is set as the thickness of the dielectric ceramic layer 20.

When the thickness of the first internal electrode layer 21 is determined, as shown in FIG. 8, a thickness Ea on the straight line La, a thickness Eb on the straight line Lb, a thickness Ec on the straight line Lc, a thickness Ed on the straight line Ld and a thickness Ee on the straight line Le are measured, and the average value of these thicknesses is set as the thickness of the first internal electrode layer 21. The same applies to a case where the thickness of the second internal electrode layer 22 is determined.

When the average thickness of multiple dielectric ceramic layers 20 is measured, the thickness is determined according to the foregoing method for each of dielectric ceramic layers 20 of five layers obtained by adding the dielectric ceramic layer 20 located substantially at the center in the lamination (T) direction with dielectric ceramic layers 20 of respective two layers located on both sides of the above-described dielectric ceramic layer 20, and the average value of these determined thicknesses is set as the average thickness of the multiple dielectric ceramic layers 20. Note that when the lamination number of the dielectric ceramic layers 20 is less than 5, the thicknesses of all of the dielectric ceramic layers 20 are determined according to the above-described method, and the average value of these determined thicknesses is set as the average thickness of the multiple dielectric ceramic layers 20. The same applies to a case where the average value of multiple first internal electrode layers 21 is calculated and a case where the average value of multiple second internal electrode layers 22 is calculated.

When the side margin 41 includes the inner layer 41a and the outer layer 41b, from the viewpoint of maintaining the shape and performance of the multilayer ceramic capacitor 1, the inner layer 41a is preferably thinner than the outer layer 41b. From the same viewpoint, when the side margin 42 includes the inner layer 42a and the outer layer 42b, the inner layer 42a is preferably thinner than the outer layer 42b.

Each of the thicknesses (the thicknesses in the width (W) direction) of the inner layer 41a and the inner layer 42a is preferably about 0.1 μm or more and about 20 μm or less, for example. The thicknesses of the inner layer 41a and the inner layer 42a are preferably equal or substantially equal to each other.

Each of the thicknesses (the thicknesses in the width (W) direction) of the outer layer 41b and the outer layer 42b is preferably about 5 μm or more and about 20 μm or less, for example. The thicknesses of the outer layer 41b and the outer layer 42b are preferably equal or substantially equal to each other. However, it is preferable that the outer layer 41b is thicker than the inner layer 41a while the thicknesses of the inner layer 41a and the outer layer 41b satisfy the above-described range. Similarly, it is preferable that the outer layer 42b is thicker than the inner layer 42a while the thicknesses of the inner layer 42a and the outer layer 42b satisfy the above-described ranges.

The thicknesses of the respective ceramic layers (for example, the inner layer 41a, the inner layer 42a, the outer layer 41b, and the outer layer 42b) defining the side margin 41 and the side margin 42 are determined as follows.

First, the WT cross-section at the central portion in the length (L) direction of the multilayer ceramic capacitor 1 is exposed by polishing. Then, end portions in the width (W) direction of the first internal electrode layers 21 and the second internal electrode layers 22 on the exposed WT cross section, and one of the side margin 41 and the side margin 42 which is closer to these end portions are imaged by using an optical microscope or an electron microscope so as to fall into the same field of view. Three places of an upper portion, a central portion and a lower portion in the lamination (T) direction are selected as places where imaging is performed. At the upper portion, the central portion and the lower portion which have been imaged, multiple line segments are drawn from the end portions in the width (W) direction of the first internal electrode layers 21 and the second internal electrode layers 22 to the lateral surface (an external end portion in the width (W) direction of imaged one of the side margin 41 and the side margin 42) of the laminate 10, and the length of each line segment corresponding to each ceramic layer is measured. Thereafter, an average value of the measured lengths of the line segments is calculated for each of the upper portion, the central portion, and the lower portion. Further, by averaging the respective average values, the thickness of each ceramic layer defining the imaged one of the side margin 41 and the side margin 42 is determined.

For example, following dimensions are preferable dimensions of the multilayer ceramic capacitor 1.

Type 1
Dimension in the length (L) direction: about 0.32 mm or more and about 0.36 mm or less
Dimensions in the width (W) direction: about 0.25 mm or more and about 0.30 mm or less
Dimension in the lamination (T) direction: about 0.25 mm or more and about 0.30 mm or less
Thickness of dielectric ceramic layer 20: about 4.7 μm or more and about 5.7 μm or less
Thicknesses of first internal electrode layer 21 and second internal electrode layer 22: about 0.9 μm or more and about 1.1 μm or less Type 2
Dimension in the length (L) direction: about 0.1 mm or more and about 0.12 mm or less
Dimension in the width (W) direction: about 0.63 mm or more and about 0.68 mm or less
Dimension in the lamination (T) direction: about 0.62 mm or more and about 0.68 mm or less
Thickness of dielectric ceramic layer 20: about 1.1 μm or more and about 1.5 μm or less
Thicknesses of first internal electrode layer 21 and second internal electrode layer 22: about 0.63 μm or more and about 0.75 μm or less In both of the types described above, the withstand voltage is improved by increasing the thickness of the dielectric ceramic layer 20. Furthermore, an effective area in which capacitance is generated can be maximized by minimizing the side margin 41 and the side margin 42. In the case of an L gap, a step occurs usually due to a difference in thickness between the dielectric ceramic layer 20 and each of the first internal electrode layer 21 and the second internal electrode layer 22, and when each layer is laminated, the first internal electrode layer 21 and the second internal electrode layer 22 are curved in the lamination (T) direction, and the electric field concentrates on a curved portion, which deteriorates reliability. On the other hand, by forming the dielectric ceramic layer 20 so as to compensate for the difference in thickness between the dielectric ceramic layer 20 and each of the first internal electrode layer 21 and the second internal electrode layer 22, the first internal electrode layer 21 and the second internal electrode layer 22 can be reduced or prevented from being curved, so that reliability is enhanced.

Method of Manufacturing Multilayer Ceramic Capacitor

A non-limiting example of a method of manufacturing a multilayer ceramic capacitor of the present invention preferably includes a step of preparing a green chip having a lamination structure including multiple raw dielectric ceramic layers and multiple pairs of a raw first internal electrode layer and a raw second internal electrode layer, the raw first internal electrode layers and the raw second internal electrode layers being exposed on a first lateral surface and a second lateral surface that oppose each other in a width direction perpendicular to a lamination direction; a step of producing a raw laminate by forming a raw side margin on the first lateral surface and the second lateral surface of the green chip; and a step of sintering the raw laminate, wherein in the step of producing the raw laminate, a raw inner layer is formed on the first lateral surface and the second lateral surface, and a raw outer layer is formed on an outermost side, thereby forming the raw side margin.

Hereinafter, an example of the method of producing the multilayer ceramic capacitor 1 shown in FIG. 1 will be described.

First, a ceramic green sheet which will be a dielectric ceramic layer 20 is prepared. The ceramic green sheet may include a binder, a solvent, etc. in addition to a ceramic raw material including a dielectric ceramic material described above. The ceramic green sheet is formed, for example, on a carrier film by using a die coater, a gravure coater, a micro gravure coater, or the like.

Figure 9A:
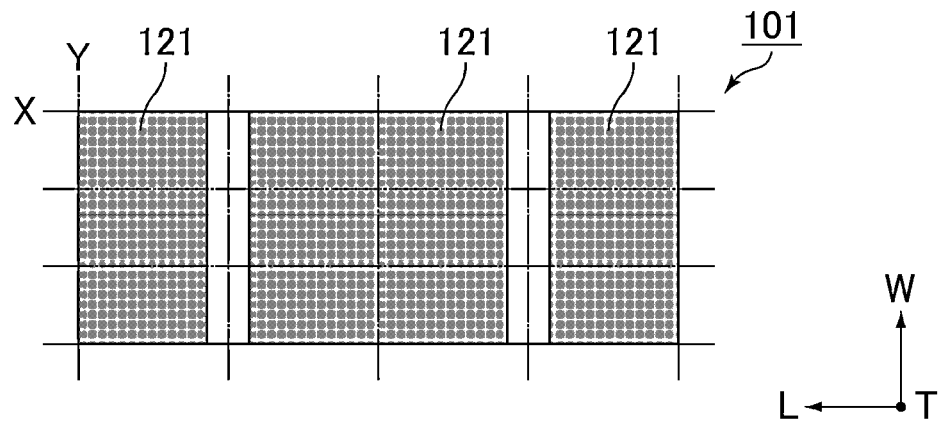
FIGS. 9A to 9C are plan views schematically showing examples of a ceramic green sheet.
Figure 9B:
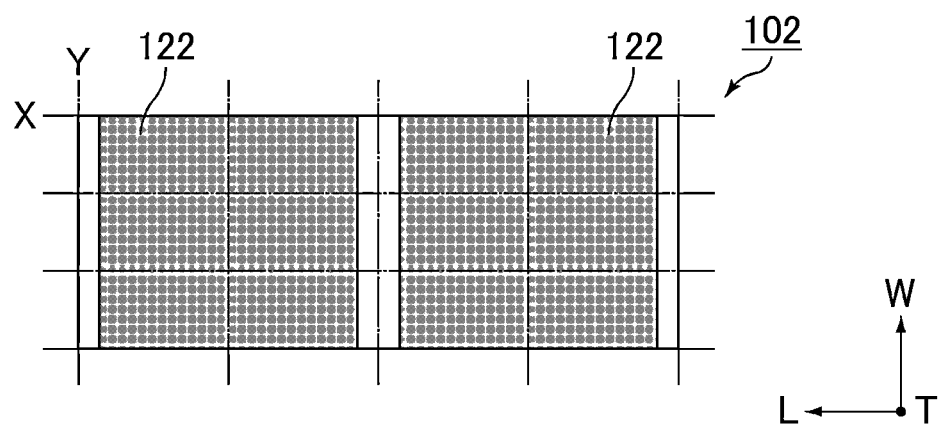
Figure 9C:
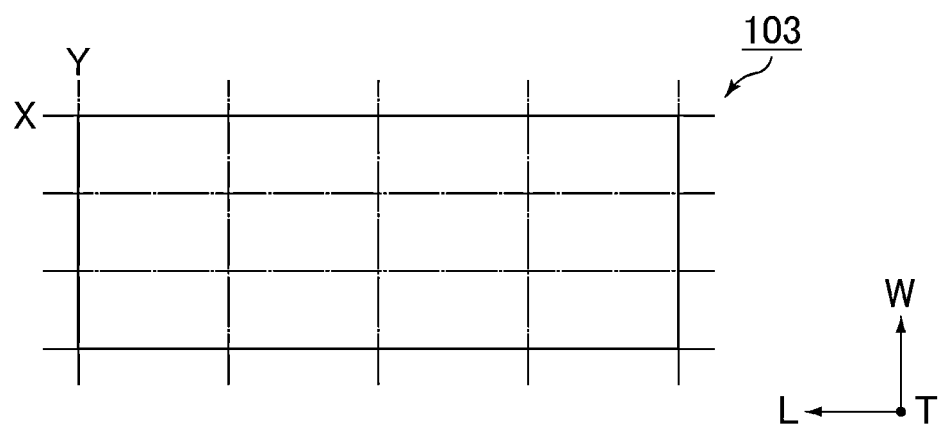

FIGS. 9A to 9C are plan views schematically showing examples of a ceramic green sheet. FIG. 9A shows a first ceramic green sheet 101 for forming the central layer portion 30. FIG. 9B shows a second ceramic green sheet 102 for forming the central layer portion 30. FIG. 9C shows a third ceramic green sheet 103 for forming the peripheral layer portions 31 or 32.

In FIGS. 9A to 9C, the first ceramic green sheet 101, the second ceramic green sheet 102, and the third ceramic green sheet 103 are not cut and divided for each multilayer ceramic capacitor 1. FIGS. 9A to 9C show cutting lines X and Y used in cutting and dividing the ceramic green sheets for each multilayer ceramic capacitor 1. The cutting lines X are parallel or substantially parallel to the length (L) direction, and the cutting lines Y are parallel or substantially parallel to the width (W) direction.

As shown in FIG. 9A, a raw first internal electrode layer 121 corresponding to a first internal electrode layer 21 is formed on the first ceramic green sheet 101. As shown in FIG. 9B, a raw second internal electrode layer 122 corresponding to a second internal electrode layer 22 is formed on the second ceramic green sheet 102. As shown in FIG. 9C, neither a raw first internal electrode layer 121 nor a raw second internal electrode layer 122 is formed on the third ceramic green sheet 103 corresponding to the peripheral layer portion 31 or 32.

Each of the raw first internal electrode layer 121 and the raw second internal electrode layer 122 is formed, for example, by using any conductive paste for the internal electrode layer. When the raw first internal electrode layer 121 and the raw second internal electrode layer 122 are formed by using the conductive paste for the internal electrode layer, for example, a printing method such as a screen printing method or a gravure printing method is used.

Each of the raw first internal electrode layer 121 and the raw second internal electrode layer 122 is formed so as to extend in the length (L) direction over two adjacent regions partitioned by a cutting line Y and also extend in a belt shape in the width (W) direction. The raw first internal electrode layer 121 and the raw second internal electrode layer 122 are in such a positional relationship that the regions partitioned by the cutting lines Y are shifted column by column in the length (L) direction. In other words, the cutting line Y passing through the center of the raw first internal electrode layer 121 passes through a region between the raw second internal electrode layers 122 (where the raw second internal electrode layer 122 is not formed). In addition, the cutting line Y passing through the center of the raw second internal electrode layer 122 passes through a region between the raw first internal electrode layers 121 (where the first internal electrode layer 121 is not formed).

Next, the first ceramic green sheet 101, the second ceramic green sheet 102, and the third ceramic green sheet 103 are laminated to form a mother block.

Figure 10:
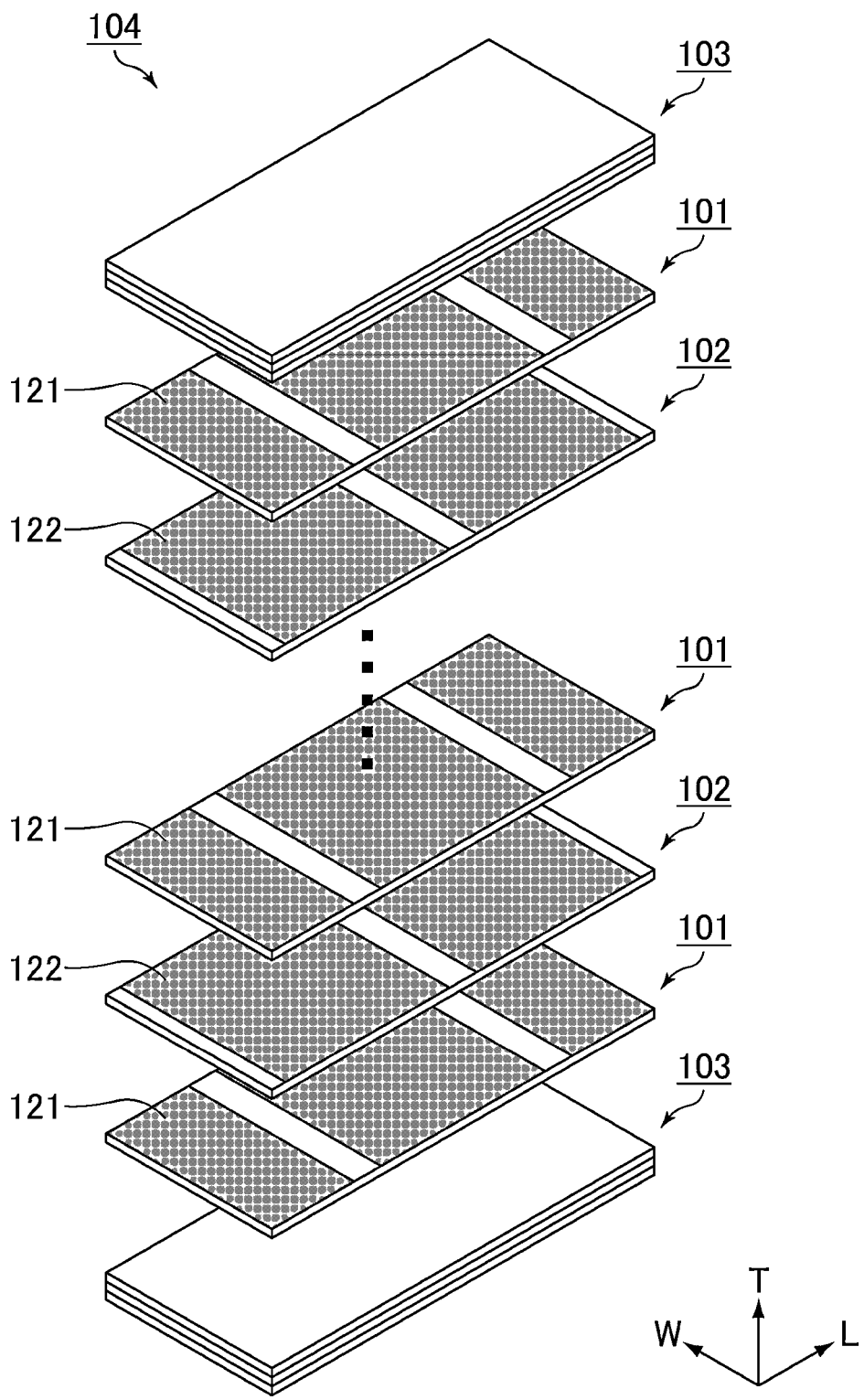
FIG. 10 is an exploded perspective view schematically showing an example of a mother block.

FIG. 10 is an exploded perspective view schematically showing an example of a mother block. In FIG. 10, the first ceramic green sheets 101, the second ceramic green sheets 102, and the third ceramic green sheets 103 are shown while exploded in the mother block 104. In the actual mother block 104, the first ceramic green sheets 101, the second ceramic green sheets 102, and the third ceramic green sheets 103 are pressed and integrated by, for example, a hydrostatic press or the like.

In the mother block 104, the first ceramic green sheets 101 and the second ceramic green sheets 102 corresponding to the central layer portion 30 are alternately laminated in the lamination (T) direction. Furthermore, the third ceramic green sheets 103 corresponding to the peripheral layer portions 31 and 32 are respectively laminated on the upper surface and the lower surface in the lamination (T) direction of the first ceramic green sheets 101 and the second ceramic green sheets 102 which are alternately laminated. Note that in FIG. 10, three third ceramic green sheets 103 are laminated on each of the upper surface and the lower surface, but the number of the third ceramic green sheets 103 may be changed as appropriate.

Next, multiple green chips are formed by cutting the mother block 104 along the cutting lines X and Y (see FIGS. 9A to 9C). When the mother block 104 is cut, for example, a cutting method such as dicing, force-cutting or laser cutting is used.

Figure 11:
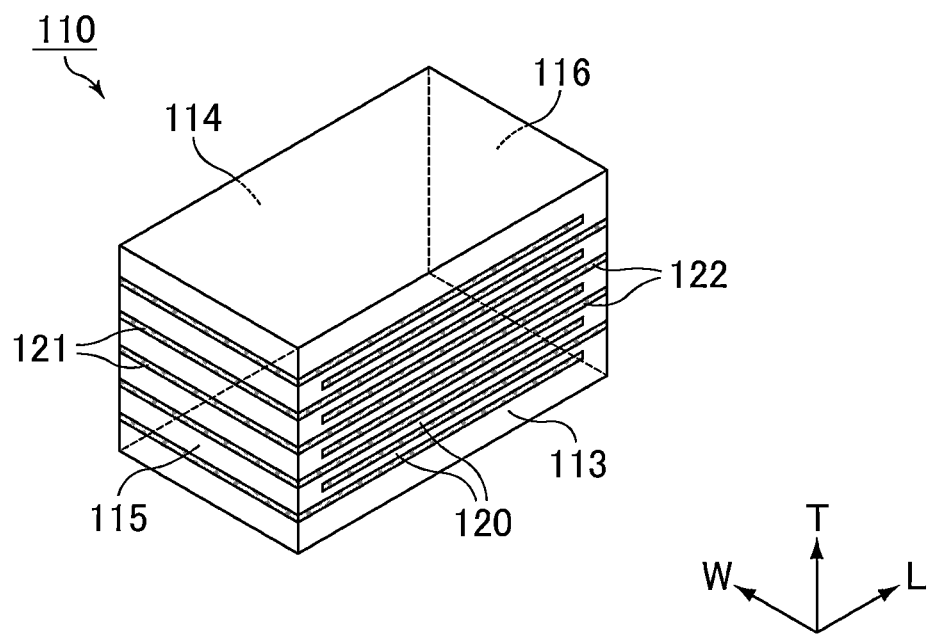
FIG. 11 is a perspective view schematically showing an example of a green chip.

FIG. 11 is a perspective view schematically showing an example of a green chip. A green chip 110 shown in FIG. 11 has a lamination structure including multiple raw dielectric ceramic layers 120, multiple raw first internal electrode layers 121, and multiple raw second internal electrode layers 122.

A first lateral surface 113 and a second lateral surface 114 of the green chip 110 are surfaces that appear when the mother block 104 is cut along the cutting line X. Both the raw first internal electrode layer 121 and the raw second internal electrode layer 122 are exposed on each of the first lateral surface 113 and the second lateral surface 114.

A first end surface 115 and a second end surface 116 of the green chip 110 are surfaces that appear when the mother block 104 is cut along the cutting line Y. Only the raw first internal electrode layers 121 of the raw first internal electrode layers 121 and the raw second internal electrode layers 122 are exposed on the first end surface 115, and only the raw second internal electrode layers 122 is exposed on the second end surface 116.

Next, a raw laminate is produced by forming a raw side margin on each of the first lateral surface 113 and the second lateral surface 114 of the green chip 110.

The raw side margins are formed, for example, by bonding side-margin ceramic green sheets to the first lateral surface 113 and the second lateral surface 114 of the green chip 110.

When the side margin is configured to have a two-layer structure including an inner layer and an outer layer, for example, the raw side margin is formed as follows.

First, in order to produce an inner-layer ceramic green sheet, ceramic slurry for the inner layer which includes a binder, a solvent, etc. in addition to a ceramic raw material including a dielectric ceramic material including $BaTiO_3$ or the like as a main component is produced. Further, the ceramic slurry for the inner layer may be included Si which is a sintering aid. The inner layer bonds to a green chip 110.

Next, in order to produce an outer-layer ceramic green sheet, ceramic slurry for the outer layer which includes a binder, a solvent, etc. in addition to a ceramic raw material including a dielectric ceramic material including $BaTiO_3$ or the like as a main component is produced. Further, the ceramic slurry for the outer layer may include Si which is a sintering aid. Further, it is preferable that Si included in the inner-layer ceramic green sheet is more than Si included in the outer-layer ceramic green sheet. A cross-section is imaged with WDX, and the content is determined according to the size of the area of a region where Si is detected.

Next, the ceramic slurry for the outer layer is applied to a surface of a resin film and dried to produce an outer-layer ceramic green sheet. Then, the ceramic slurry for the inner layer is applied to a surface of the outer-layer ceramic green sheet which is opposite to the resin film, and dried to produce an inner-layer ceramic green sheet. Thereafter, the lamination sheet of the inner-layer ceramic green sheet and the outer-layer ceramic green sheet is separated from the resin film to obtain a side-margin ceramic green sheet having the two-layer structure.

Note that the side-margin ceramic green sheet having the two-layer structure can also be obtained, for example, by preparing the inner-layer ceramic green sheet and the outer-layer ceramic green sheet separately from each other in advance and then bonding them together. The side-margin ceramic green sheet may have a structure including three or more layers instead of the two-layer structure described above.

Next, the first lateral surface 113 of the green chip 110 is pressed against the inner-layer ceramic green sheet side of the side-margin ceramic green sheet and punched out, such that the raw side margin is formed on the first lateral surface 113 of the green chip 110. Furthermore, the second lateral surface 114 of the green chip 110 is pressed against the inner-layer ceramic green sheet side of the side-margin ceramic green sheet and punched out, such that the raw side margin is formed on the second lateral surface 114 of the green chip 110. At this time, it is preferable that an organic solvent defining and functioning as an adhesive is applied in advance to each lateral surface of the first lateral surface 113 and the second lateral surface 114 of the green chip 110. The raw laminate has been obtained through the foregoing steps.

Alternatively, the raw side margins may be formed, for example, by applying ceramic slurry for the side margin to a first lateral surface 113 and a second lateral surface 114 of the green chip 110.

When the side margin has a two-layer structure including an inner layer and an outer layer, first, the ceramic slurry for the inner layer is applied to each of the first lateral surface 113 and the second lateral surface 114 of the green chip 110 and dried, thus forming the raw inner layer. Then, the ceramic slurry for the outer layer is applied to a surface of the raw inner layer which is opposite to the green chip 110, and dried to form the raw outer layer. As a result, the raw side margin is formed.

The ceramic slurry for the side margin may be applied by the following method. When the side margin has a two-layer structure including an inner layer and an outer layer, first, each end surface of the first end surface 115 and the second end surface 116 of the green chip 110 is covered (masked) with, for example, resin or the like. Then, the green chip 110 whose end surfaces have been covered with resin or the like is entirely immersed (dipped) in the ceramic slurry for the inner layer and dried to form the raw inner layer. Thereafter, the green chip 110 on which the raw inner layer has been formed is immersed (dipped) in the ceramic slurry for the outer layer as a whole, and dried to form the raw outer layer. In this case, the raw inner layer and the raw outer layer are also formed on the raw peripheral layer portion.

The raw laminate obtained by the above method is subjected to barrel polishing or the like. By polishing the raw laminate, the corner portions and edges of the sintered laminate 10 are rounded. At this time, by lengthening the polishing time, the corner portions of the raw laminate can be excessively polished. As a result, the thicknesses of the corner portions of the sintered laminate 10 are small, so that $W_1 > R_1$ can be satisfied and $T_1 > R_1$ can be satisfied.

Subsequently, in the raw laminate, a conductive paste for the external electrodes including Ni and a ceramic material is applied to each end surface of the first end surface 115 and the second end surface 116 of the green chip 110.

It is preferable that the conductive paste for the external electrodes includes, as a ceramic material, the same dielectric ceramic material as the outer-layer ceramic green sheet or the ceramic slurry for the outer layers. The content of the ceramic material in the conductive paste for the external electrodes is preferably about 15 wt % or more, for example. Furthermore, the content of the ceramic material in the conductive paste for external electrodes is preferably about 25 wt % or less, for example.

Next, the raw laminate to which the conductive paste for the external electrodes has been applied is subjected to, for example, a degreasing treatment under a predetermined condition in a nitrogen atmosphere, and then sintered at a predetermined temperature in a nitrogen-hydrogen-steam mixed atmosphere. As a result, the raw laminate and the conductive paste for the external electrodes are simultaneously sintered, and the laminate 10, the Ni layer to be connected to the first internal electrode layer 21, and the Ni layer to be connected to the second internal electrode layer 22 are simultaneously formed by a co-fire method. Thereafter, a first plating layer based on Ni plating and a second plating layer based on Sn plating are sequentially laminated on the surface of each of the Ni layers. As a result, the first external electrode 51 and the second external electrode 52 are formed.

Note that the laminate 10 and each of the first external electrode 51 and the second external electrode 52 may be formed at different times by a post-fire method. Specifically, first, the raw laminate is subjected to, for example, a degreasing treatment under a predetermined condition in a nitrogen atmosphere, and then sintered at a predetermined temperature in a nitrogen-hydrogen-steam mixed atmosphere to form the laminate 10. Thereafter, a conductive paste including Cu powder, for example, is applied to each end surface of the first end surface 15 and the second end surface 16 of the laminate 10, and then baked. As a result, the base electrode layer to be connected to the first internal electrode layer 21 and the base electrode layer to be connected to the second internal electrode layer 22 are formed. Thereafter, a conductive resin layer including conductive particles (for example, metal particles of Cu, Ag, Ni or the like) and resin, a first plating layer based on Ni plating, and a second plating layer based on Sn plating are sequentially laminated on the surface of each of the base electrode layers. As a result, the first external electrode 51 and the second external electrode 52 are formed.

The multilayer ceramic capacitor 1 has been manufactured through the above steps.

In the non-limiting example of a method of manufacturing the multilayer ceramic capacitor 1 described above, the mother block 104 is cut along the cutting lines X and Y to produce multiple green chips 110, and then the raw side margins are formed on both lateral surfaces of the first lateral surface 113 and the second lateral surface 114 of the green chip 110, thus producing the raw laminate. However, the process may be changed as follows.

First, multiple rod-shaped green blocks each including the raw first internal electrode layer 121 and the raw second internal electrode layer 122 exposed on both lateral surfaces which are cut surfaces are produced by cutting the mother block 104 along the cutting lines X. Thereafter, the raw side margins are formed on both lateral surfaces of the green block, and then the green block is cut along the cutting lines Y to produce multiple raw laminates. Thereafter, the multilayer ceramic capacitor 1 is manufactured according to the same manner as described above.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a laminate including a dielectric ceramic layer and an internal electrode layer that are laminated in a lamination direction; and
an external electrode connected to the internal electrode layer; wherein
the laminate includes a main surface that faces in the lamination direction and a lateral surface that faces in a width direction perpendicular or substantially perpendicular to the lamination direction;
the laminate includes a central layer portion in which the internal electrode layer and the dielectric ceramic layer are alternately laminated, and a covering portion covering an outer surface of the central layer portion in the lamination direction and the width direction;
a region where the main surface meets the lateral surface in the laminate is defined as a corner portion, the corner portion is rounded; and
when viewing the laminate and the external electrode through a cross-section parallel or substantially parallel to the width direction and the lamination direction, the internal electrode layer closest to the corner portion is directly connected to the external electrode at at least one corner portion of the laminate.

2. The multilayer ceramic capacitor according to claim 1, wherein
the main surface includes a first main surface and a second main surface that oppose each other in the lamination direction;
the lateral surface includes a first lateral surface and a second lateral surface that oppose each other in the width direction;
the laminate includes a first end surface and a second end surface that oppose each other in a length direction perpendicular or substantially perpendicular to the lamination direction and the width direction;
the internal electrode layer includes a first internal electrode layer extending to the first end surface, and a second internal electrode layer extending to the second end surface so as to oppose the first internal electrode layer with the dielectric ceramic layer therebetween;
the external electrode includes a first external electrode disposed on the first end surface and connected to the first internal electrode layer, and a second external electrode disposed on the second end surface and connected to the second internal electrode layer;
the laminate includes the central layer portion in which the first internal electrode layer and the second internal electrode layer are alternately laminated with the dielectric ceramic layer therebetween, and the covering portion including a peripheral layer portion sandwiching the central layer portion in the lamination direction and a side margin sandwiching the central layer portion and the peripheral layer portion in the width direction;
the first external electrode extends from the first end surface of the laminate over a portion of each of the first main surface and the second main surface; and
when viewing the laminate and the first external electrode through a cross-section parallel or substantially parallel to the width direction and the lamination direction at a central portion in the length direction of the first external electrode disposed on the first main surface or the second main surface of the laminate, a maximum value of a dimension in the width direction of the side margin is represented by $W_1$.

3. The multilayer ceramic capacitor according to claim 2, wherein at at least one corner portion of the laminate, the first internal electrode layer closest to the first main surface or the second main surface of the laminate is connected to the first external electrode.

4. The multilayer ceramic capacitor according to claim 2, wherein when viewing the laminate through a cross-section parallel or substantially parallel to the width direction and the lamination direction at a central portion in the length direction of the laminate, a maximum value of a dimension in the width direction of the side margin is represented by $W_0$, $W_0 > W_1$ is satisfied.

5. The multilayer ceramic capacitor according to claim 2, wherein the maximum value $W_1$ of the dimension in the width direction of the side margin is about 25 μm or less.

6. The multilayer ceramic capacitor according to claim 2, wherein the side margin includes an inner layer on an innermost side in the width direction and an outer layer on an outermost side in the width direction.

7. The multilayer ceramic capacitor according to claim 2, wherein a thickness of each of the first internal electrode layer and the second internal electrode layer is about 0.4 μm or less.

8. The multilayer ceramic capacitor according to claim 7, wherein the thickness of each of the first internal electrode layer and the second internal electrode layer is about 0.38 μm or less.

9. The multilayer ceramic capacitor according to claim 2, wherein a thickness of the dielectric ceramic layer is about 0.55 μm or less.

10. The multilayer ceramic capacitor according to claim 2, wherein
each of the first external electrode and the second external electrode includes a Ni layer including Ni and a ceramic material; and
the ceramic material is present in the Ni layer in an amount of about 25 area % or more and about 40 area % or less.

11. The multilayer ceramic capacitor according to claim 10, wherein the ceramic material is present in the Ni layer in an amount of about 25 area % or more and about 35 area % or less.

12. The multilayer ceramic capacitor according to claim 2, wherein each of the first and second internal electrode layers includes at least one metal selected from the group consisting of Ni, Cu, Ag, Pd, Au, and Ag—Pd alloy.

13. The multilayer ceramic capacitor according to claim 2, wherein the first external electrode also extends from the first end surface of the laminate over a portion of each of the first lateral surface and the second lateral surface.

14. The multilayer ceramic capacitor according to claim 2, wherein the second external electrode extends from the second end surface of the laminate over a portion of each of the first main surface and the second main surface.

15. The multilayer ceramic capacitor according to claim 14, wherein the second external electrode also extends from the second end surface of the laminate over a portion of each of the first lateral surface and the second lateral surface.

16. The multilayer ceramic capacitor according to claim 2, wherein each of the first and second external electrodes includes a Ni layer, a first plating layer, and a second plating layer in order.

17. The multilayer ceramic capacitor according to claim 16, wherein
the first plating layer is a Ni plating layer; and
the second plating layer is a Sn plating layer.

18. The multilayer ceramic capacitor according to claim 16, wherein each of the first and second external electrodes includes a conductive resin layer between the Ni layer and the first plating layer.

19. The multilayer ceramic capacitor according to claim 18, wherein the conductive resin layer includes metal particles of at least one selected from the group consisting of Cu, Ag, and Ni.

* * * * *